United States Patent [19]
Chumbley

[11] Patent Number: 5,535,118
[45] Date of Patent: Jul. 9, 1996

[54] DATA COLLECTION DEVICE

[76] Inventor: Gregory R. Chumbley, 2999 Concorde Centre Dr., #902, Miami, Fla. 33180

[21] Appl. No.: 392,345

[22] Filed: Feb. 22, 1995

[51] Int. Cl.⁶ .................................................. G06F 19/00
[52] U.S. Cl. ...................................................... 364/401 R
[58] Field of Search ..................................... 364/400, 401, 364/402, 419.19, 146, 147, 188; 235/376, 380, 381, 382, 375

[56] References Cited

U.S. PATENT DOCUMENTS

| | | | |
|---|---|---|---|
| Re. 31,951 | 7/1985 | Johnson et al. | 364/900 |
| 4,345,315 | 8/1982 | Cadotte et al. | 364/900 |
| 4,775,935 | 10/1988 | Yourick | 364/401 |
| 4,882,675 | 11/1989 | Nichtberger et al. | 364/401 |
| 4,900,905 | 2/1990 | Pusic | 235/381 |
| 4,982,346 | 1/1991 | Girouard et al. | 364/550 |
| 5,023,435 | 6/1991 | Deniger | 235/375 |
| 5,053,956 | 10/1991 | Donald et al. | 364/401 |
| 5,237,157 | 8/1993 | Kaplan | 364/401 |
| 5,250,789 | 10/1993 | Johnsen | 364/401 |
| 5,309,355 | 5/1994 | Lockwood | 364/401 |
| 5,339,239 | 8/1994 | Manabe et al. | 364/401 |

Primary Examiner—Donald E. McElheny, Jr.
Attorney, Agent, or Firm—Robert M. Downey

[57] ABSTRACT

A data collection device and a method of collecting data using the device is disclosed, the device including a housing having a front face, back panel, opposite sides and base, and a visual character display on the front face for providing instructional information to a user of the device. A central processor unit within the housing stores data, including preprogrammed data and collected data in a primary memory, and controls operation of the components of the device, including an optical mark reader structured to pull a pre-printed data card through a first slot opening for scanning thereof in order to identify darkened spaces on the card. The optical mark reader transfers data, based on the identified darkened spaces, to the central processor for matching, consolidation and storage along with corresponding preprogrammed data stored in a primary memory. The central processor unit then activates a thermal printer which prints and dispenses a coupon through a second slot opening on the housing for retrieval by the user. A serial port and built-in modem facilitate transfer of data between the devices primary memory and a remote computer database.

14 Claims, 3 Drawing Sheets

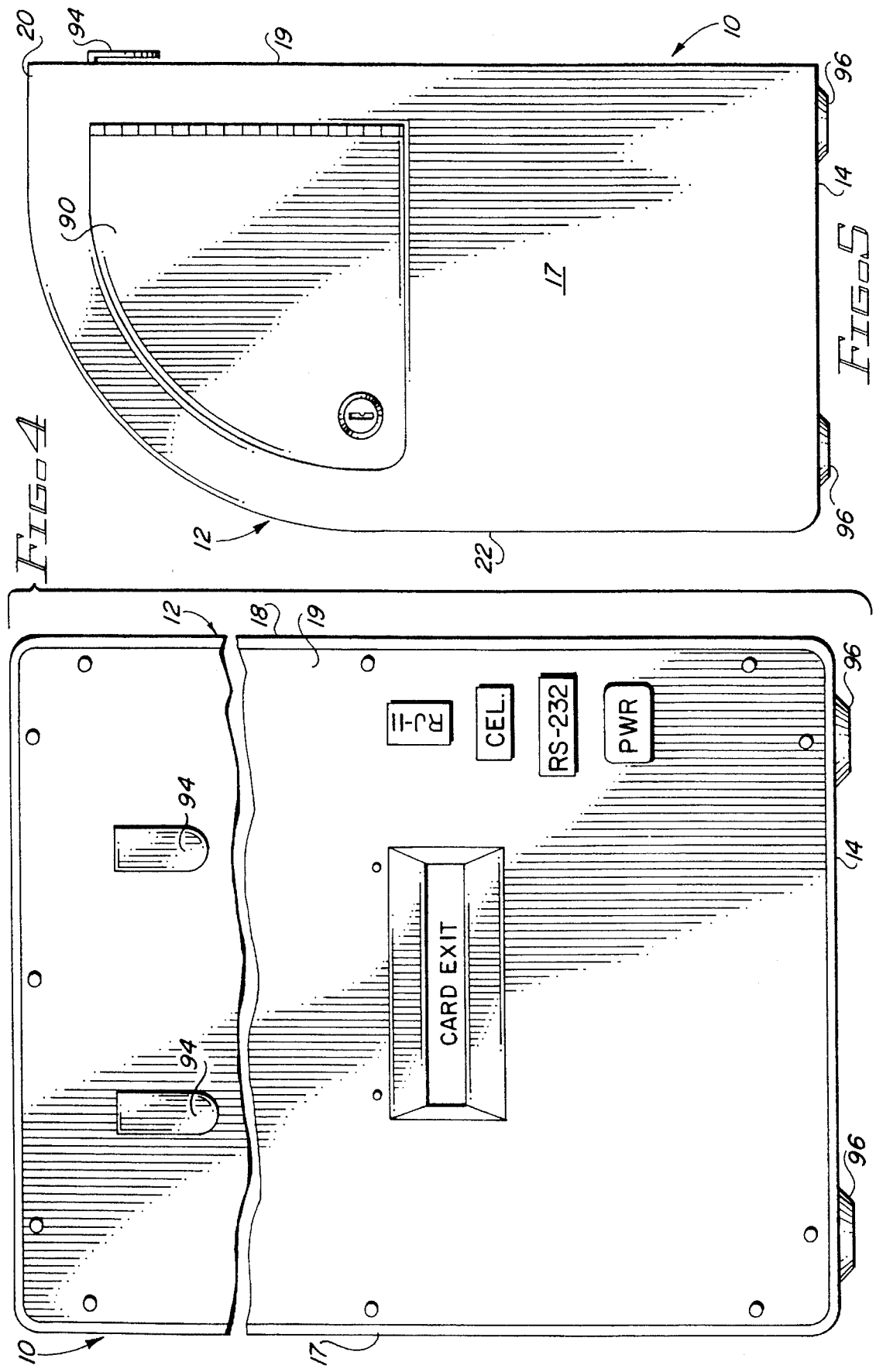

DATA COLLECTION DEVICE

BACKGROUND OF THE INVENTION

1. Field of the Invention

The present invention relates to data collection devices and, more specifically to a device for collecting data from a data card of the type including a plurality of pre-printed enclosed spaces (or bubbles) intended to be selectively darkened in response to an inquiry, such as on a survey questionnaire or ballot.

2. Description of the Related Art

Information is perhaps the most valuable resource to private businesses and governments, particularly information relating to public opinion and consumer satisfaction. Thus, the need for effective market research is essential for the survival and growth of any business. However, the collecting of public opinion and consumer satisfaction data is a daunting and expensive task, often requiring the services of a professional market research firm. Ordinarily, such information is gathered through the use of surveys specifically designed for a particular business, industry or government agency and possibly directed at a controlled group of consumers or citizens.

There have been various survey-conducting apparatus and other data collection devices developed in the art to facilitate automated collection of data. Specifically, the Cadotte et al., U.S. Pat. No. 4,345,315 discloses an electronic terminal for electronically collecting opinion data from customers from a service organization as to the satisfaction with the services rendered. The terminal includes a keyboard that displays inquiries with multiple-choice responses for each inquiry. A response is associated with each key, whereby the respondent presses the appropriate keys in connection with the associated response. A response, by operation of the keys is electronically recorded by a microprocessor controller, visually displaying to the customer each selection. A tally of the answers is permanently recorded in the terminal. Other related devices are disclosed in the patents to Johnson et al., U.S. Pat. No. Re. 31,951 and Itoh et al., U.S. Pat. No. 5,091,877. These devices are specifically designed to collect data electronically and transmit this data to a central memory.

A common drawback of the devices set forth above is that they require specific programming in order to correlate responses to the questions. Each time the questions to a survey are changed, or a new survey is created, these devices need to be reprogrammed. This procedure is not only time consuming, but costly and generally requires the services of a person having expertise in programming such devices. Further, the market survey and data collection devices set forth above generally require the user to input responses to questions, using keys, thus requiring a substantial level of interaction with the device, inevitably leading to user error, frustration and/or inaccurate data input.

It is generally known in the field of market research that the average person is reluctant to devote any of their time and attention in order to complete a survey, whether conducted by interview, completing a survey form or using electronic devices of the type described above. In fact, many people find it to be a nuisance when approached by a person conducting a survey, and in some instances the would-be respondents may express their irritation and even become hostile. This is primarily due to the fact that the would-be respondents (persons being asked to submit to a survey) fail to realize any personal gain from the otherwise time consuming and annoying interruption to their personal lives. In light of this, it is believed that people would be more willing and accepting to being surveyed if there were some incentive or "carrot" to entice the respondent. Knowing that there is something to be gained from the task, many otherwise reluctant individuals would be prompted to participate in a survey.

Accordingly, in order to provide this incentive and eliminate the problems associated with data collection devices in the related art, the present invention is designed to collect data from scannable data forms that have been completed by a respondent, at his or her leisure, and to further dispense a valuable coupon to the respondent upon surrender of the completed survey form by inserting it in the device.

SUMMARY OF THE INVENTION

The present invention is directed to a device for collecting data from a data card of the type including an array of pre-printed enclosed areas (or bubbles) printed on the card in accordance with a predetermined arrangement and intended to be selectively and individually darkened in response to questions, such as in a survey questionnaire or ballot.

The device of the present invention includes a housing having a front face, a back panel, a base, a first slot opening and a second slot opening in the front face. A central processor unit, such as a PC-104 motherboard within an interior of the housing, includes a control circuit for controlling operation of the various components of the device and a memory means for storing data. A visual display means on the housing provides instructional information relating to use and operation of the device. An optical mark reader (OMR) positioned and disposed adjacent to the first slot opening within the housing interior is structured to pull the data card through the slot opening for scanning in order to determine the location of the darkened (filled-in) bubbles relative to fixed timing marks along the outer boarders of the card. The OMR sends data corresponding with the readings of the darkened bubbles to the motherboard for storage in the motherboard's memory.

A thermal printer supported within the housing includes a printer memory for storing precreated coupon designs. Once the OMR sends the data to the motherboard, indicating that the data card has been completed and inserted in the device, the motherboard activates the thermal printer. Upon activation, the thermal printer retrieves one of several stored coupons from the printer memory and prints the coupon onto thermal paper contained on a roll adjacent the second slot opening within the housing interior. As the coupon is printed, the thermal paper is pulled from the roll and directed outwardly from the coupon slot for retrieval by the user. The coupon is automatically cut from the roll after being fully dispensed.

The present invention employs the use of a Visual Basic program, run on an independent computer, for designing the survey questionnaires, including a list of survey questions and the corresponding data card which is provided with rows of bubbles to be selectively darkened by a respondent in response to the survey questions or other printed inquiries which may be attached to the card. The Visual Basic program also facilitates designing of the coupons to be stored in a coupon file and subsequently transmitted to the motherboard's memory and thereafter transferred to the printer memory in the device.

After responding to each inquiry, by darkening the appropriate bubbles with a pen or pencil, the data card, if attached, is separated from a remainder of the survey brochure for insertion into the device. The data card is further provided with a litho code along the top edge, the litho code corresponding to the particulars of a survey, such as survey version (1 through 12), whether the survey is single or double sided, and whether the language of the character display is to be English, French, German, Spanish or Portuguese. Accordingly, when a data card is inserted in the device, the OMR reads the litho code thereon, enabling the motherboard to match the data card with these survey particulars.

With the foregoing in mind, it is a primary object of the present invention to provide a data collection device adapted to read data on a data card and record the data and thereafter dispense a printed receipt or coupon.

It is a further object of the present invention to provide a device for collecting data as is required for conducting surveys or balloting, wherein the device is designed either for mounting in a fixed, permanent position, or completely portable and supported on a table top.

It is still a further object of the present invention to provide a device for collecting data at remote locations for subsequent transfer to a central data base in order to generate reports such as the results of a survey or vote.

It is yet a further object of the present invention to provide a device for collecting data as normally required to conduct a survey or for balloting, wherein the device is specifically designed to dispense a printed coupon of predetermined value upon receipt of a completed data card as an incentive to survey respondents.

These and other objects of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 4 is a rear elevation of the device illustrating a mounting bracket, serial port, modem port, and power connection of the device; and FIG. 5 is a side elevation of the device.

Like reference numerals refer to like parts throughout the several views of the drawings.

DETAILED DESCRIPTION OF THE PREFERRED EMBODIMENT

Figure 1:
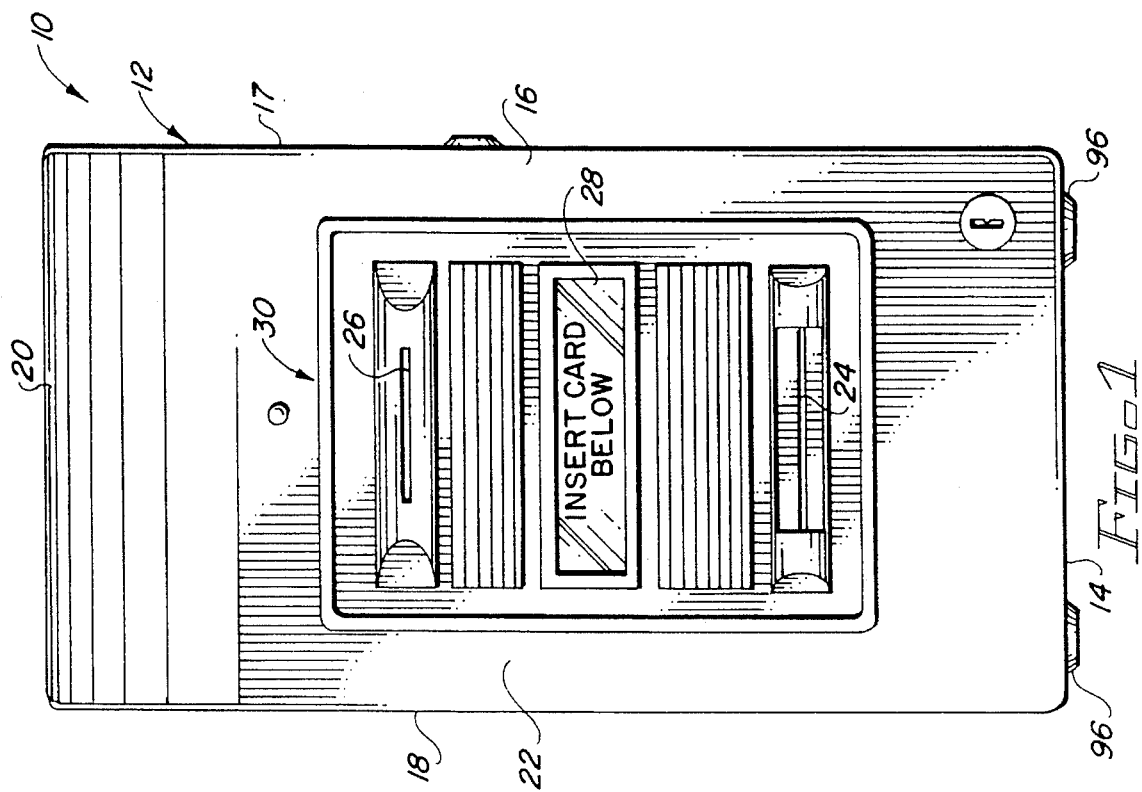
FIG. 1 is a front elevational view of the device of the present invention.

Referring initially to FIGS. 1, 4 and 5, there is illustrated the data collection device of the present invention, referred to generally as 10. The data collecting device 10 includes a housing 12 having a base 14, a front panel 16, opposite sides 17, 18 and a back panel 19. The front panel 16 may be formed and configured to extend from the top edge of the back panel 19 to the base 14, to define a top side 20 and a front face 22.

The front face includes a first slot opening 24, a second slot opening 26 and a character display 28. In a preferred embodiment, the character display 28 is comprised of a back-lit liquid crystal display structured and disposed to present messages to a user of the device, including instructional information relating to operation of the device. The back-lit liquid crystal display includes an independent power source 29 to energize the light source in the display 28. A motion sensor 30 on the front face 22 interconnects with the character display 28 and includes switch means to energize the light source of the display 28 for a predetermined time interval upon detecting motion within a predetermined distance from the front face 22.

Figure 2:
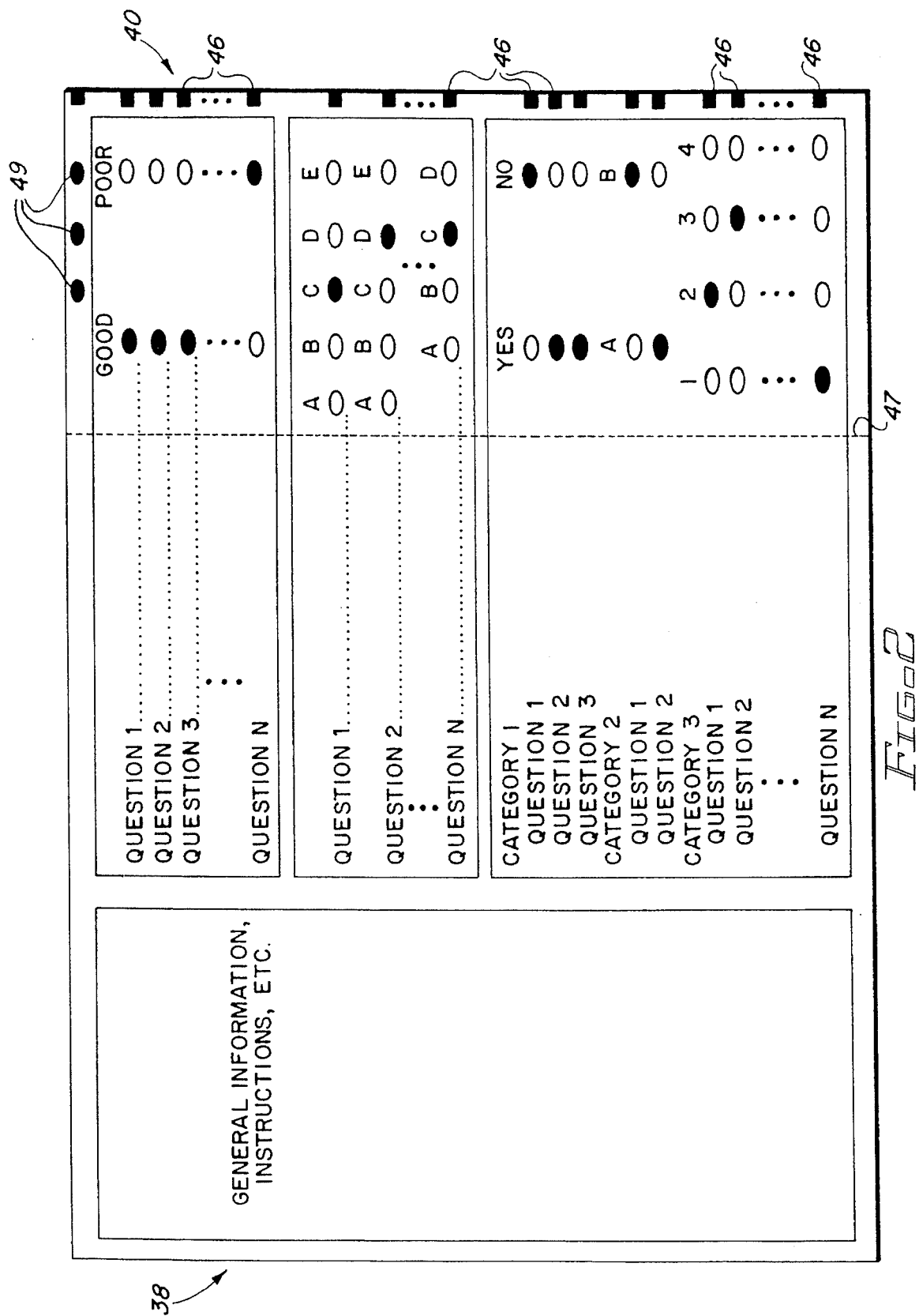
FIG. 2 is a top plan view, showing a sample of a questionnaire, including a data card, as used in connection with the present invention.

As described earlier, the present invention employs the use of a Visual Basic program run on an independent computer 100 for designing surveys specific to the user. The designed surveys generally include printed text on a sheet 38 incorporating survey questions or other inquiries as well as a corresponding data card 40 having rows of bubbles 22 which are specifically spaced and positioned relative to fixed reference points on the data card 40, commonly referred to as timing marks 46 as seen in FIG. 2. The survey questionnaire and data card can be designed as a brochure wherein the data card is attached to the survey questions along a perforated seam 47. A master copy of the created survey or questionnaire is printed from the computer. Thereafter, duplicate copies of the master are made and distributed to potential respondents. Depending upon the nature of the inquiries, the questionnaire may be distributed in a controlled manner, targeting a specific group of respondents. Once having completed the survey by darkening in select bubbles 42 with a pen or pencil, the data card can be separated from the remainder of the survey brochure by tearing along the perforated seam 47. The designed survey is stored in a labeled file in the computer 100, and specifically identified as being associated with the labeled file by a litho-code which is printed along a top of the data card. The litho code corresponds to the particulars of a survey, such as the survey version (1 through 12), whether the survey is single or double sided, and the language to be used on the character display (i.e. English, French, German, Spanish or Portuguese).

Figure 3:
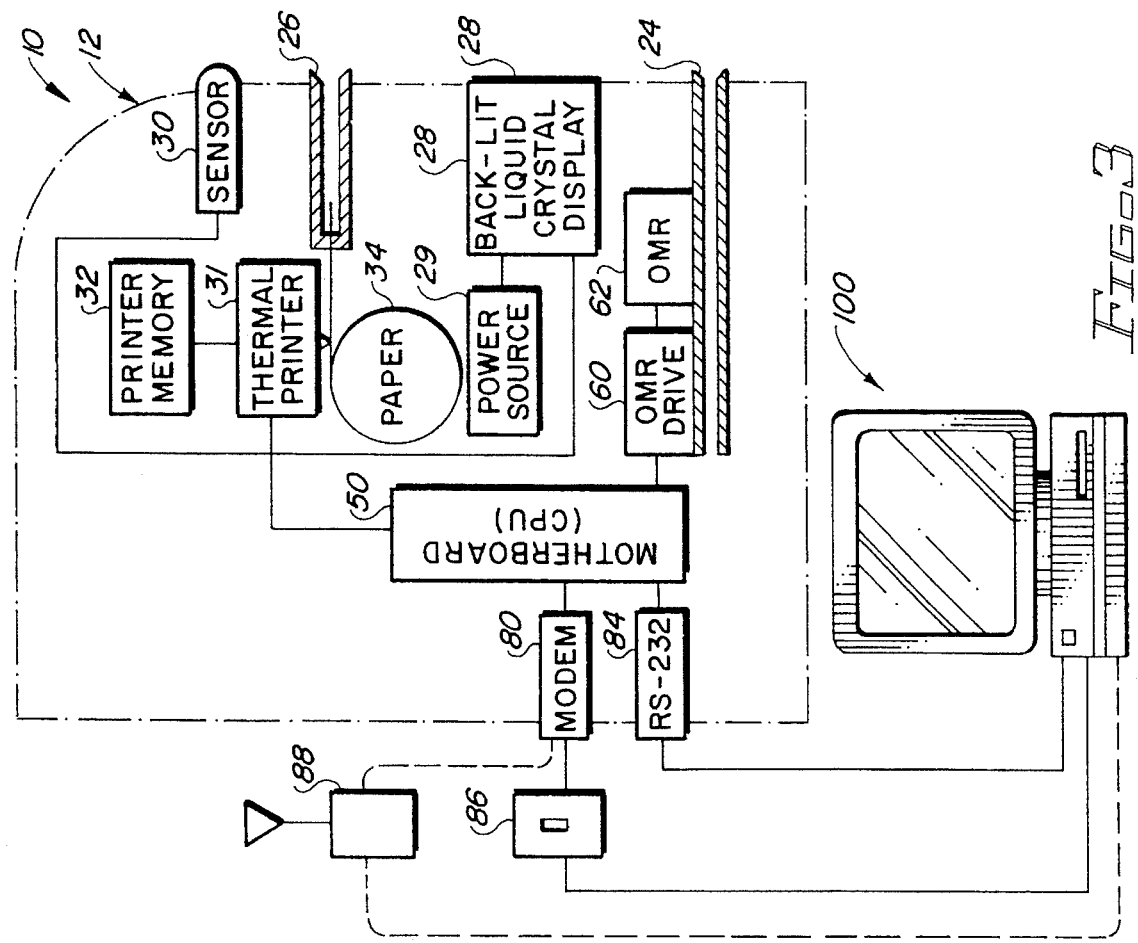
FIG. 3 is a schematic diagram illustrating the various components of the device of the present invention.

Referring to FIG. 3, there is schematically illustrated the device 10 of the present invention, including the various component elements thereof. Specifically, the device 10 includes a central processor unit 50 including a control circuit for controlling operation of the various components of the device and a memory means for storing data therein. In a preferred embodiment, the central processor unit 50 is a PC-104 motherboard.

The visual character display 28 interconnects with the motherboard 50 and receives messages from the motherboard memory for display. The particular messages transmitted from the motherboard 50 to display 28 are prompted by various actions and operations of the various components.

An optical mark reader (OMR) 60 supported within the housing 12 interior includes a drive assembly 62 specifically structured to pull the data card through the slot opening and past the optical mark reader 60 for scanning thereof. The OMR 60 is specifically structured to scan and read the data card once pulled therethrough in order to detect and locate darkened areas on the card, including the litho-code, timing marks and darkened (filled-in) bubbles. The OMR sends data corresponding with the readings taken from the data card to the motherboard for storage in the motherboard's memory. This data is thereafter consolidated in the motherboard's memory in accordance with the particular litho code identifying the survey version. Thus, all response data from the scanned data cards is grouped and consolidated for each survey version.

A thermal printer 70 supported within the housing includes a printer memory 72 for storing precreated coupon designs. The specific coupon designs (files) are created using the Visual Basic program on the computer 100 and are subsequently downloaded to the PC-104 motherboard. This data is thereafter transferred to the printer's memory 72. Once the OMR sends the data from the scanned data cards to the motherboard, indicating that the data card has been completed and inserted in the device, the motherboard 50 activates the thermal printer 70. Upon activation, the thermal printer 70 retrieves one of several stored coupons from the printer's memory 72 and prints the coupon onto thermal paper contained on a roll 74 adjacent the second slot opening. The thermal printer 70 includes means for pulling the paper from the roll 74 to deliver a predetermined length thereof through the coupon slot opening for retrieval by the user.

In order to facilitate downloading of the coupon data and survey files from the computer 100 to the motherboard 50, as well as uploading of data files created in the motherboard memory, the device 10 is provided with a 2400 baud modem 80. The modem 80 facilitates transfer of data between the computer 100 and the motherboard 50 via a telephone line connection 86 or a cellular connection transceiver 88. Alternatively, an RS-232 serial port 84 facilitates direct connection of the computer 100 to the device 10. The consolidated response data, once transferred from the motherboard's memory to the computer 100, is matched with the corresponding labeled file in the remote computer database. The data collected in the labeled file is thereafter used to generate various statistical reports based on responses received from various inquires of the survey.

Printed reports can also be obtained from the device 10 using a control card having a specific litho code printed along a top of the card. In this instance, the control card is inserted through the first slot opening 24 so that the OMR reads the litho code thereon. The scanned litho code is transmitted to the motherboard 50, commanding the motherboard to consolidate the response data in accordance with a predetermined format, for a specific file or for all survey files (versions 1–12). The motherboard is further commanded to transmit this formated data to the thermal printer 70 for printing thereof. The resultant report generated and printed indicates the serial number of the device, the survey version number (1–12) the current date and time, and the total number of responses followed by a row and column number (coordinates) of each bubbled (darkened area) detected by the OMR from each of the scanned data cards inserted by the respondents. Further, the report indicates the total number of each and every bubble that has been recorded as having been darkened. For example, if 56 respondents who have completed and submitted a particular data card for a specific survey (i.e., version 1) have darkened in a bubble located at row 6, column 9 on the data card, then a printed report will show:

Row 6, Column 9=56

The report is printed from the thermal printer in order by survey version number (1–12); each page of the report being sequentially numbered. A separate control card is similarly used to delete the data in individual ones of the survey files.

As seen in FIG. 5, the housing 12 is provided with an access door 90 on the side panel 17 in order to facilitate access to the housing interior for replacing paper rolls and repairing paper jams. Referring to FIG. 4, it is seen that the back panel 19 of the housing 12 is provided with mounting brackets 94 to facilitate mounting of the device 10 on a wall surface or a booth. Alternatively, rubber feet 96 on the base 14 facilitate upright support of the device 10 on a flat table or like surface.

What is claimed is:

1. A device for collecting response data for a plurality of survey versions, said response data being collected from a data card of the type including an array of enclosed areas printed on the card in accordance with a predetermined positioning and arrangement thereof, the enclosed areas to be selectively darkened in response to one or more inquiries of a particular survey version, wherein each darkened area represents a response to a corresponding inquiry;

said device comprising:

a housing including a front faced a back panel, a base, a first slot opening in said front face sized and configured for receipt of the data card therethrough and a second slot opening sized and configured for dispensing a predetermined length of a paper strip therefrom, a central processor unit within an interior of said housing and including control circuit means for controlling operation of said device, and primary memory means for storing data, including said response data, therein, visual display means on said housing for displaying information including instructional information relating to use and operation of said device, an optical mark reader positioned and disposed within said interior of said housing in communication with said first slot opening and structured to scan and read said data card to identify the darkened enclosed areas thereon and transmit said response data to said central processor unit corresponding with the location of each identified darkened area within said array relative to a fixed reference on said data card, said response data being stored in said primary memory means, said optical mark reader being further structured to scan and read indicia on said card identifying one of said plurality of survey versions, wherein said data card and said response data thereon correspond with said identified one of said plurality of survey versions, printer means supported within said housing interior and including a printer memory means for storing a plurality of pre-created coupons, each of said plurality of survey versions corresponding with at least one of said plurality of pre-created coupons, said printer means being actuated by said central processor unit to print indicia on said paper strip representing one of said plurality of pre-created coupons stored in said printer memory means, said one of said plurality of pre-created coupons printed by said printer means corresponding with said identified one of said plurality of survey versions, and said printer means being further structured to dispense a select length of said paper strip, with said one of said plurality of pre-created coupons printed thereon, through said second slot opening for retrieval by a user of said device.

2. A device as recited in claim 1 further including means for transmitting and receiving data between said device and a remote computer database.

3. A device as recited in claim 2 wherein said means for transmitting and receiving data includes a modem structured to transmit and receive said data through a telephone line connection.

4. A device as recited in claim 2 wherein said means for transmitting and receiving data includes a modem structured to transmit and receive said data through a cellular connection transceiver.

5. A device as recited in claim 2 wherein said printer means includes a thermal printer.

6. A device as recited in claim 2 wherein said visual display means includes a liquid crystal display having back light means.

7. A device as recited in claim 6 further including a motion sensor supported on said front face of said housing and being structured to actuate said back light means of said liquid crystal display for a predetermined time interval upon detection of motion within a predetermined range relative to said front face.

8. A device as recited in claim 2 wherein said optical mark reader includes drive means for engaging and pulling said data card through said first slot opening for scanning thereof.

9. A method of collecting data from respondents using the device as recited in claim 2, comprising the steps of:

creating one or more questionnaires, including said data card, using a visual basic computer program, and storing said questionnaire in one of a plurality of labeled files in said remote computer database, said questionnaire having one or more inquiries requiring a response, and wherein each of said enclosed areas on said data card corresponds to a select answer to said one or more inquiries of said questionnaire, assigning an identification code to said created questionnaire, the identification code corresponding to the labeled file in which said questionnaire is stored, printing a master copy of said questionnaire including said identification code printed thereon, making a select number of duplicate copies of said questionnaire from said master copy, distributing said duplicate copies of said questionnaire to the respondents, wherein the respondents respond to the inquiries by darkening select ones of said enclosed areas on said data card, thereby completing said data card, accepting completed data cards individually from the respondents through said first slot opening of said device, scanning said data cards with said optical mark reader to identify the darkened enclosed areas and the assigned identification code thereon, transmitting said response data relating to the identified darkened enclosed areas and assigned identification code from said optical card reader to said primary memory means for storage therein, consolidating said response data from said scanned data cards in accordance with said identification code, transmitting said consolidated response data to said remote computer database, matching said consolidated response data with the corresponding labeled file in said remote computer database, and generating a statistical report for each of said labeled files based on a comparison of said consolidated response data with said inquiries of said questionnaire.

10. A method as recited in claim 9 further including the step of printing said generated statistical reports.

11. A method as recited in claim 9 further including the steps:

creating a coupon using the visual basic computer program, and storing said created coupon in a coupon data file in said remote computer database, transmitting said coupon data file to said central processor unit of said device for storage therein, transmitting said coupon data file from said central processor unit to said printer memory means, printing said created coupon on said paper strip upon actuation of said printer means by said central processor unit, and dispensing said paper strip with said created coupon printed thereon from said second slot opening of said device.

12. A device for collecting response data for a plurality of survey versions, said response data being collected from a data card of the type including an array of enclosed areas printed on the card in accordance with a predetermined positioning and arrangement thereof, the enclosed areas to be selectively darkened in response to one or more inquiries of a particular survey version, wherein each darkened area represents a response to a corresponding inquiry;

said device comprising:

a housing including a front face, a back panel, a base, a first slot opening in said front face sized and configured for receipt of the data card therethrough, and a second slot opening sized and configured for dispensing a predetermined length of a paper strip therefrom, a central processor unit within an interior of said housing and including control circuit means for controlling operation of said device, and primary memory means for storing data, including said response data, therein, visual display means on said housing for displaying information including instructional information relating to use and operation of said device, an optical mark reader positioned and disposed within said interior of said housing in communication with said first slot opening and structured to scan and read said data card to identify the darkened enclosed areas thereon and transmit said response data to said central processor unit corresponding with the location of each identified darkened area within said array relative to a fixed reference on said data card, said response data being stored in said primary memory means, said optical mark reader being further structured to scan and read indicia on said card identifying one of said plurality of survey versions, wherein said data card and said response data thereon correspond with said identified one of said plurality of survey versions, printer means supported within said housing interior and including a printer memory means for storing a plurality of precreated coupons, each of said plurality of survey versions corresponding with at least one of said plurality of pre-created coupons, said printer means being actuated by said central processor unit to print indicia on said paper strip representing one of said plurality of pre-created coupons stored in said printer memory means, said one of said plurality of pre-created coupons printed by said printer means corresponding with said identified one of said plurality of survey versions, said printer means being further structured to dispense a select length of said paper strip, with said one of said plurality of pre-created coupons printed thereon, through said second slot opening for retrieval by a user of said device, and a motion sensor supported on said front face of said housing and being structured to actuate said visual display means for a predetermined time interval upon detection of motion within a predetermined range relative to said front face.

13. A device as recited in claim 12 wherein said printer means includes a thermal printer.

14. A device as recited in claim 12 wherein said visual display means includes a liquid crystal display having back light means.

* * * * *